United States Patent [19]

Wu

[11] 4,429,888
[45] Feb. 7, 1984

[54] TOY DUMP TRUCK

[76] Inventor: Shane-Mau Wu, 107 Shin An Rd., Shihlin, Taipei, Taiwan

[21] Appl. No.: 333,436

[22] Filed: Dec. 22, 1981

[51] Int. Cl.³ .............................................. B62K 9/00
[52] U.S. Cl. .............................. 280/1.11 R; 461/214; 298/1 T
[58] Field of Search .................. 280/1.11 R; 296/177; 46/214; 298/1 T, 19 R, 10

[56] References Cited

U.S. PATENT DOCUMENTS

| 1,640,357 | 8/1927 | Howe | 280/1.11 R |
| 2,852,888 | 9/1958 | Horward | 46/214 X |
| 3,358,850 | 12/1967 | Neils | 280/1.11 R |

FOREIGN PATENT DOCUMENTS 108308 8/1943 Sweden .............................. 298/19 R
744766 4/1933 France ................................ 298/19 R

*Primary Examiner*—John A. Pekar
*Attorney, Agent, or Firm*—Cushman, Darby & Cushman

[57] ABSTRACT

A ridable toy dump truck powered by foot pedals to selectively either rotate wheels to propel the dump truck across a surface or to lift or recover a dump bed. The rotational force derived from the foot pedals is transmitted through a chain to a drive shaft. A second sprocket on the drive shaft transmits rotational force to predetermined wheels to propel the vehicle, while a third sprocket on the drive shaft transmits force to raise or lower the dump bed. A sliding clutch selects whether the second or the third sprocket is driven. A control handle engages the clutch so that a rider may select between propelling the dump truck across a surface, or raising or lowering the dump bed.

8 Claims, 3 Drawing Figures

TOY DUMP TRUCK

BACKGROUND OF THE INVENTION

Children's ridable toy cars often have either three or four wheels. Variations between different ridable toy cars are usually limited to the outer shape of the car, the presence of steering wheels instead of steering handles, and the addition of accessories, such as horns, lights and simple brake means. Such simple toy cars provide riding pleasure only, and are often too simple to arouse the curiosity of children, so that they may be discarded by the child after only a short period of playtime.

SUMMARY OF THE INVENTION

This invention provides to a new toy dump truck which may be driven forwards or backwards. The toy dump truck is also equipped with a dump bed which may be lifted for dumping out materials or objects carried inside of it. The dump truck is designed to be driven by the manual operation by the rider of foot pedals. The truck is equipped with a control handle to allow the rider to select whether the energy derived from the pedals either is applied to predetermined wheels for propelling the vehicle across a surface, or directed to a lift mechanism to raise or lower the dump bed.

BRIEF DESCRIPTION OF THE DRAWINGS

A more complete understanding of this invention and appreciation of its improvements and advancements may be obtained from the following detailed description and accompanying drawings, of which.

DETAILED DESCRIPTION OF THE PREFERRED EXEMLARY EMBODIMENT

Figure 1:
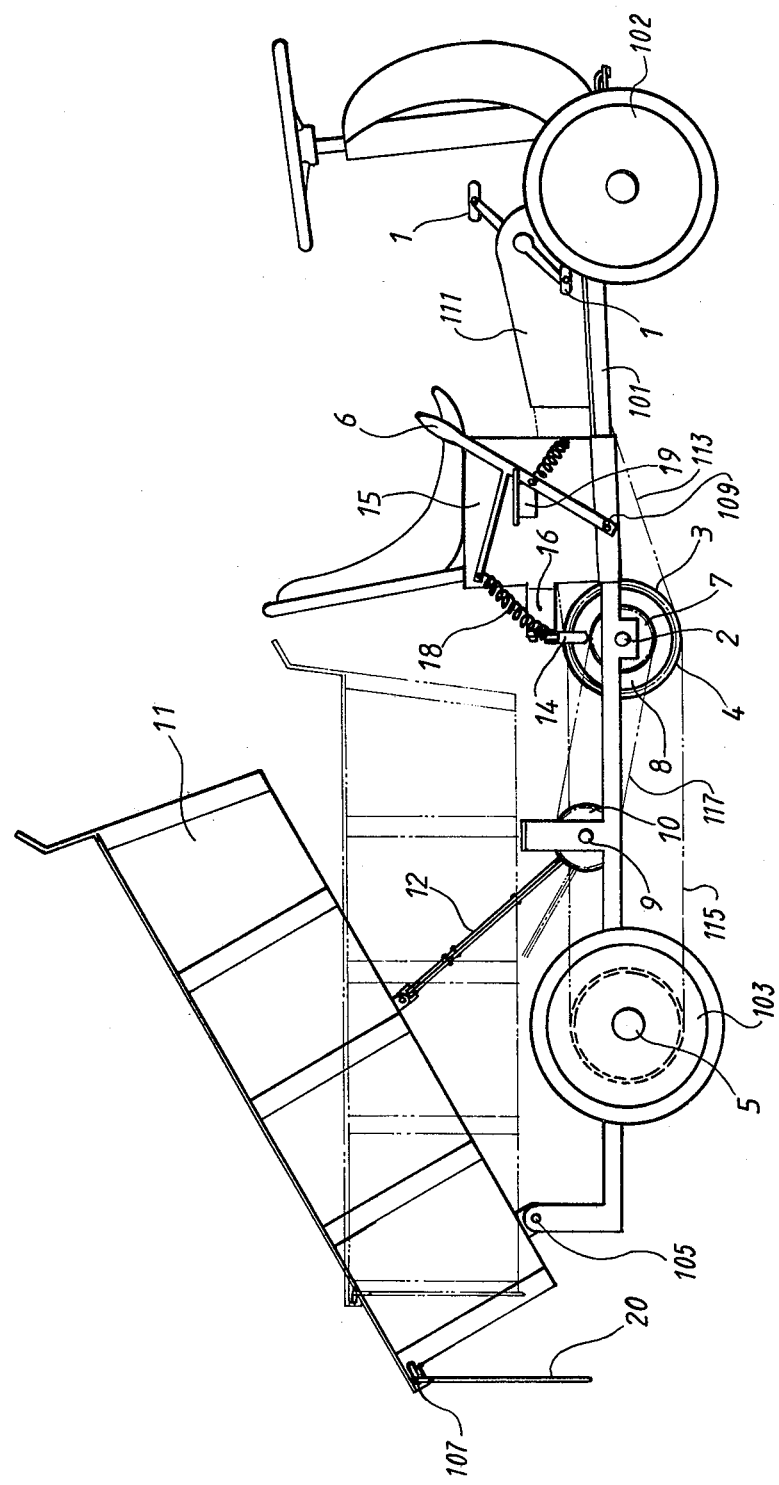
FIG. 1 is a side view of an exemplary embodiment of this invention.
Figure 2:
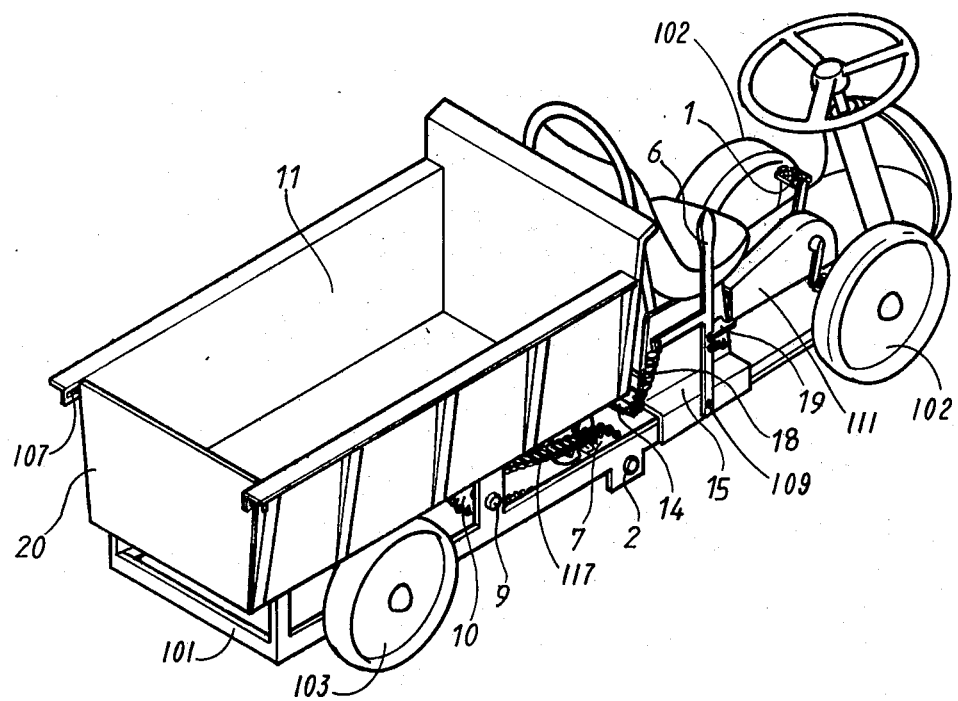
FIG. 2 is a side elevational view of an exemplary embodiment of this invention.
Figure 3:
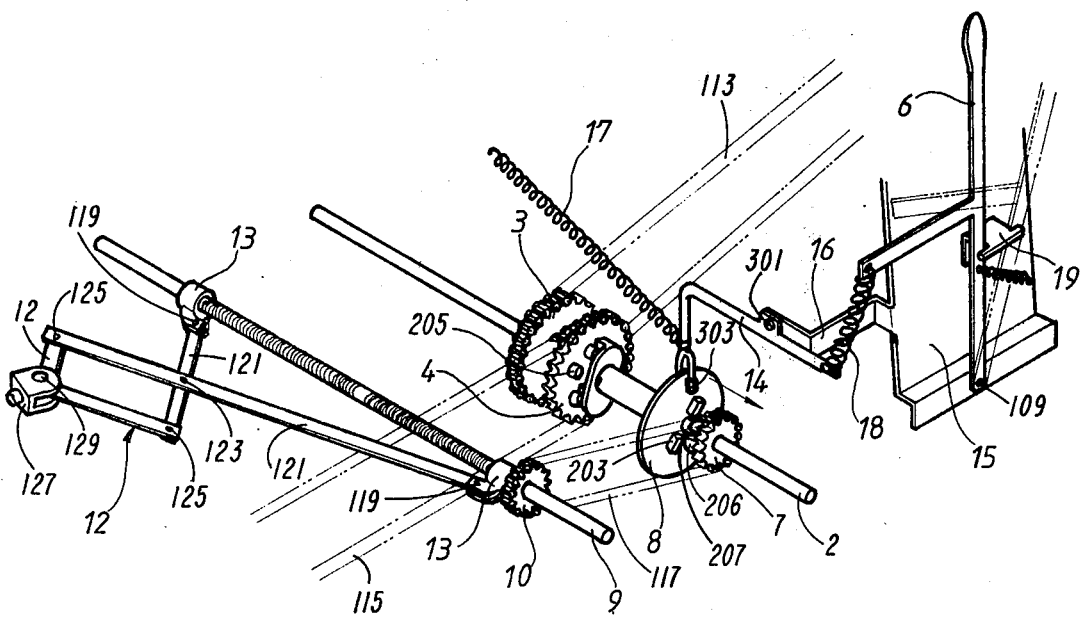
FIG. 3 is a perspective view of the drive train of an exemplary embodiment of this invention.

Referring to FIG. 1, front wheels 102 and rear wheels 103 are journaled to a frame 101 to support frame 101 and to allow frame 101 to move across the surface. A dumb bed 11 is journaled to frame 101 by axle means 105 to enable it to hinge on axle means 105 and thus to be raised or lowered. Objects or material placed in dump bed 11 will slide out when dump bed 11 is raised. A tailgate 20 is journaled to the rear of dump bed 11 by sliding axle means 107 to retain objects inside dump bed 11 when dump bed 11 is in a horizontal position, and to allow objects to slide out when dump bed 11 is in a raised position. Referring to FIG. 1 and FIG. 3, foot pedals 1 are journaled to a chain guard 111. Foot pedals 1 can be rotated manually by a rider. The rotational force of foot pedals 1 is transmitted to a drive shaft 2 through a chain 113 to a drive sprocket 3 positioned on drive shaft 2. The drive sprocket 3 is locked to drive shaft 2 so that drive shaft 2 and drive sprocket 3 turn together at all times.

Also journaled to drive shaft 2 is a propulsion sprocket 4 which is free to rotate independently of drive shaft 2. The propulsion sprocket 4 is connected through a chain 115 to rear wheel axle 5 in order to transmit rotational force to rear wheels 103. Journaled to drive shaft 2 is a dump sprocket 7 which is free to rotate independently of drive shaft 2. A guide screw rod 9 is journaled to frame 101. The dump sprocket 7 is connected to guide screw rod 9 through a chain 117 and a sprocket 10 which is journaled to guide screw rod 9. When dump sprocket 7 rotates, rotational force is transmitted to guide screw rod 9 to cause it to rotate.

Two half portions of the guide screw rod 9 are threaded. One half of guide screw rod 9 is threaded with a left-handed thread, while the other half of guide screw rod 9 is threaded with a right-handed thread. A threaded sleeve 13 is threaded onto each of the threaded portions of guide screw rod 9. Connected to threaded sleeves 13 through axle member 119 are two rods 121. Rods 121 are connected together somewhere along their length by an axle member 123. Connected to the ends of rods 121 not connected to threaded sleeves 13 are two rods 12, through axle member 125. Rods 12 are connected together and to joint 127 through axle member 129. Joint 127 is fixedly mounted to bottom of dumb bed 11. When guide screw rod 9 rotates, the distance between threaded sleeves 13 will change as threaded sleeves 13 travel along left- and right-hand threaded portions of guide screw rod 9. This motion will cause rods 121 and rods 12 to scissor about their axle members 123 and 125, respectively, causing the distance between guide screw rod 9 and joint 127 to change. Dump bed 11 will be raised or lowered as rods 121 and rods 12 scissor. The direction of motion of dump bed 11 will depend upon the direction of the rotation of guide screw rod 9.

Located between propulsion sprocket 4 and dump sprocket 7 is sleeve clutch 8, which is journaled to drive shaft 2 by means of a kev (not shown) so that sleeve clutch 8 may slide reciprocally along drive shaft 2 and rotate along with drive shaft 2. Extending from the face of propulsion sprocket 4 which faces sleeve clutch 8 are several studs 205. Extending from the face of dump sprocket 7 facing sleeve clutch 8 is a ring 206 with a slot 207 indented in it. Extending from both sides of sleeve clutch 8 are retaining studs 203.

When sleeve clutch 8 contacts propulsion sprocket 4, studs 203 of sleeve clutch 8 will mesh with the studs 205 of propulsion sprocket 4. This meshing will cause sleeve clutch 8 and propulsion sprocket 4 to achieve operation union, so that propulsion sprocket 4 will rotate along with sleeve clutch 8 and drive shaft 2. In this way, rotational force will be transmitted to rear axle 5.

When sleeve clutch 8 contacts dump sprocket 7, studs 203 of sleeve clutch 8 will mate with slot 207 indented in ring 205 of dump sprocket 7. Sleeve clutch 8 and dump sprocket 7 will achieve operative union, so that dump sprocket 7 will rotate along with sleeve clutch 8 and drive shaft 2. In this way, rotational force will be transmitted to guide screw rod 9 in order to raise or lower dump bed 11.

A fork rod 14 is journaled to guard board 15 through axle member 301. Guard board 15 is attached to frame 101. Fork rod 14 may pivot about axle member 301. Extending from one end of fork rod 14 are two fingers 303, which contact sleeve clutch 8 so as to retain sleeve clutch 8 in its rectilinear position along drive shaft 2 without substantially interfering with the rotational motion of sleeve clutch 8. As fork rod 14 is pivoted, the fingers 303 on the end of fork rod 14 will cause the sleeve clutch 8 to slide along drive shaft 2 into mating contact with either propulsion sprocket 4 or with dump sprocket 7. Positioning spring 17 forces fork rod 14 to pivot towards propulsion sprocket 4.

A control handle 6 is journaled to guard board 15 through axle member 109. Control handle 6 may rotate about axle member 109. Attached to control handle 6 is spring 18. The other end of spring 18 is connected to fork rod 14. As control handle 6 is pushed forward, spring 18 will pivot fork rod 14 toward dump sprocket 7. Positional piece 19 is mounted to guard board 15 to retain control handle 6 in one of two fixed positions. When control rod 6 is placed behind positioning piece 19, fork rod 14 will pivot by the force of positioning spring 17, and will cause sleeve clutch 8 to mate with drive sprocket 4. When control rod 6 is placed in front of positioning piece 19, spring 18 will pull fork rod 14 and cause it to pivot so as to mate sleeve clutch 8 with dump sprocket 7. Thus, control handle 6 allows a rider to select between propelling the dump truck across a surface or raising or lowering dump bed 11.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

I claim:
1. A ridable toy dump truck comprising:
   a frame;
   plural wheels journaled to said frame for supporting said dump truck for rolling movement across a surface;
   a dump bed pivotably mounted on said frame for moving between a raised position and a lowered position;
   drive train means, manually operable by a rider, for providing a driving force to predetermined ones of said wheels to move said dump truck across said surface and to move said dump bed between said raised and lowered positions; and
   clutch means, operably associated with said drive train means and manually operable by said rider, for directing said driving force either to cause said dump truck to move across said surface or to cause said dump bed to move between said raised and lowered positions.

2. A ridable toy dump truck as in claim 1 wherein said drive train means comprises:
   a rotatable drive shaft;
   input means, journaled to said drive shaft, for allowing said rider to induce said drive shaft to rotate;
   propulsion means, journaled to said drive shaft, for transmitting driving force to said predetermined ones of said wheels;
   dumping means, journaled to said drive shaft, for transmitting force to move said dump bed between said raised and lowered positions; and
   selecting means, connected to said clutch means, for permitting said rider to operate said clutch; and
   wherein said clutch means comprises a body rotating with said drive shaft and reciprocally movable to a go position or to a dump position, for engaging said propulsion means while in said go position to effect operative union between said propulsion means and said drive shaft, and for engaging said dump means while in said dump position to effect operative union between said dump means and said drive shaft.

3. A ridable toy dump truck as in claim 2 wherein said input means comprises pedal means, journaled to said frame, for accepting force manually applied by the feet of said rider.

4. A ridable toy dump truck as in claim 3 wherein said clutch means comprises:
   a propulsion sprocket, journaled to said drive shaft, capable of rotational movement independent of said drive shaft but incapable of substantial rectilinear movement along said drive shaft, for transmitting rotational force to said propulsion means;
   a dump sprocket, journaled to said drive shaft, capable of rotational movement independent of said drive shaft but incapable of substantial rectilinear movement along said drive shaft, for transmitting rotational force to said dumping means;
   a sleeve, journaled to said drive shaft, located between said propulsion sprocket and said dump sprocket, for moving in a reciprocal rectilinear motion along said drive shaft to contact said propulsion sprocket or said dump sprocket;
   first mating means, for selectively coupling said sleeve with said propulsion dump sprocket; and
   second mating means, for selectively coupling said sleeve with said sprocket.

5. A ridable toy dump truck as in claim 4 wherein:
   said first mating means comprises:
      a first plurality of protrusions extending from a surface of said propulsion sprocket, and
      a second plurality of protrusions extending from a surface of said sleeve, said second plurality of protrusions being disposed on said sleeve surface to engage said first plurality of protrusions when said sleeve is brought in contact with said propulsion sprocket; and
   said second mating means comprises:
      a third plurality of protrusions extending from a surface of said sleeve, and
      an annulus concentrically disposed with and fixed to said dump sprocket, said annulus defining a plurality of indentations disposed in said annulus to engage said third plurality of protrusions when said sleeve is brought in contact with said dump sprocket.

6. A ridable toy dump truck as in claim 5 wherein said selecting means comprises:
   a fork rod, pivotably mounted to said frame, extending from one end of which are a plurality of fingers which contact said sleeve, said plurality of fingers not substantially impeding said sleeve from rotational movement but substantially impeding said sleeve from rectilinear movement along said drive shaft, for sliding said sleeve in a reciprocal rectilinear motion along said drive shaft and for positioning said sleeve to contact said propulsion sprocket or said dump sprocket to engage said mating means;
   biasing means, connected to said fork rod, for retaining said fork rod in a position to engage said first mating means or in a position to engage said second mating means; and
   a control handle, journaled to said frame through an axle member, manually operable by said rider, and coupled to said fork rod, for controlling the position of said fork rod.

7. A ridable toy dump truck as in claim 6 wherein said dumping means comprises:

a rotatable dumping shaft;

a first means, journaled to said dumping shaft and coupled to said dump sprocket on said drive shaft, for coupling said dumping shaft to said dump sprocket to cause said dumping shaft to rotate when said dump sprocket rotates;

a first threaded sleeve, journaled to said dumping shaft on a length of left-hand threads cut into said dumping shaft, for moving rectilinearly along said dumping shaft as said dumping shaft rotates;

a second threaded sleeve, journaled to said dumping shaft on a length of right-hand threads cut into said dumping shaft, for moving rectilinearly along said dumping shaft as said dumping shaft rotates; and a scissors means, for changing the distance between said dump bed and said dumping shaft as the distance between said first threaded sleeve and said second threaded sleeve changes, said scissors means comprising:

a first rod, journaled to said first threaded sleeve by first axle means;

a second rod, journaled to said second threaded sleeve by second axle means and journaled to said first rod by third axle means; and a means for connecting said dump bed to said first rod and to said second rod.

8. A ridable toy dump truck comprising:

a frame;

plural wheels journaled to said frame for supporting said dump truck for rolling movement across a surface;

a dump bed, pivotably mounted on said frame, for moving between a raised position and a lowered position;

drive train means, manually operably by a rider, for providing a driving force to predetermined one of said wheels to move said dump truck across said surface and to move said dump bed between said raised and lowered positions, said drivetrain means including:

a rotatable drive shaft;

input means, journaled to said drive shaft, for allowing said rider to induce said drive shaft to rotate, said input means comprising pedal means, journaled to said frame, for accepting force manually applied by the feet of said rider;

propulsion means, journaled to said drive shaft, for transmitting driving force to said predetermined ones of said wheels; and dumping means, journaled to said drive shaft, for transmitting force to move said dump bed between said raised and lowered positions;

clutch means, operably associated with said drive train means and manually operable by said rider, rotatable with said drive shaft and reciprocally movable to a go position or to a dump position, for engaging said propulsion means while in said go position to effect operative union between said propulsion means and said drive shaft, and for engaging said dump means while in said dump position to effect operative union between said dump means and said drive shaft, said clutch means including a propulsion sprocket, journaled to said drive shaft, capable of rotational movement independent of said drive shaft but incapable of substantial rectilinear movement along said drive shaft, for transmitting rotational force to said propulsion means;

a dump sprocket, journaled to said drive shaft, capable of rotational movement independent of said drive shaft but incapable of substantial rectilinear movement along said drive shaft, for transmitting rotational force to said dumping means;

a sleeve, journaled to said drive shaft, located between said propulsion sprocket and said dump sprocket, for moving in a reciprocal rectilinear motion along said drive shaft to contact said propulsion sprocket or said dump sprocket;

first mating means for selectively coupling said sleeve with said propulsion sprocket including a first plurality of protrusions extending from a surface of said propulsion sprocket, and a second plurality of protrusions extending from a surface of said sleeve, said second plurality of protrusions being disposed on said sleeve surface to engage said first plurality of protrusions when said sleeve is brought in contact with said propulsion sprocket; and second mating means for selectively coupling said sleeve with said dump sprocket, including a third plurality of protrusions extending from a surface of said sleeve, and an annulus concentrically disposed with and fixed to said dump sprocket, said annulus defining a plurality of indentations disposed in said annulus to engage said third plurality of protrusions when said sleeve is brought in contact with said dump sprocket.

* * * * *